Dec. 28, 1965 L. R. McROBERT 3,225,771
ROLLER-TYPE SEPARATING MEANS FOR A POTATO HARVESTER
Original Filed June 26, 1961 3 Sheets-Sheet 2
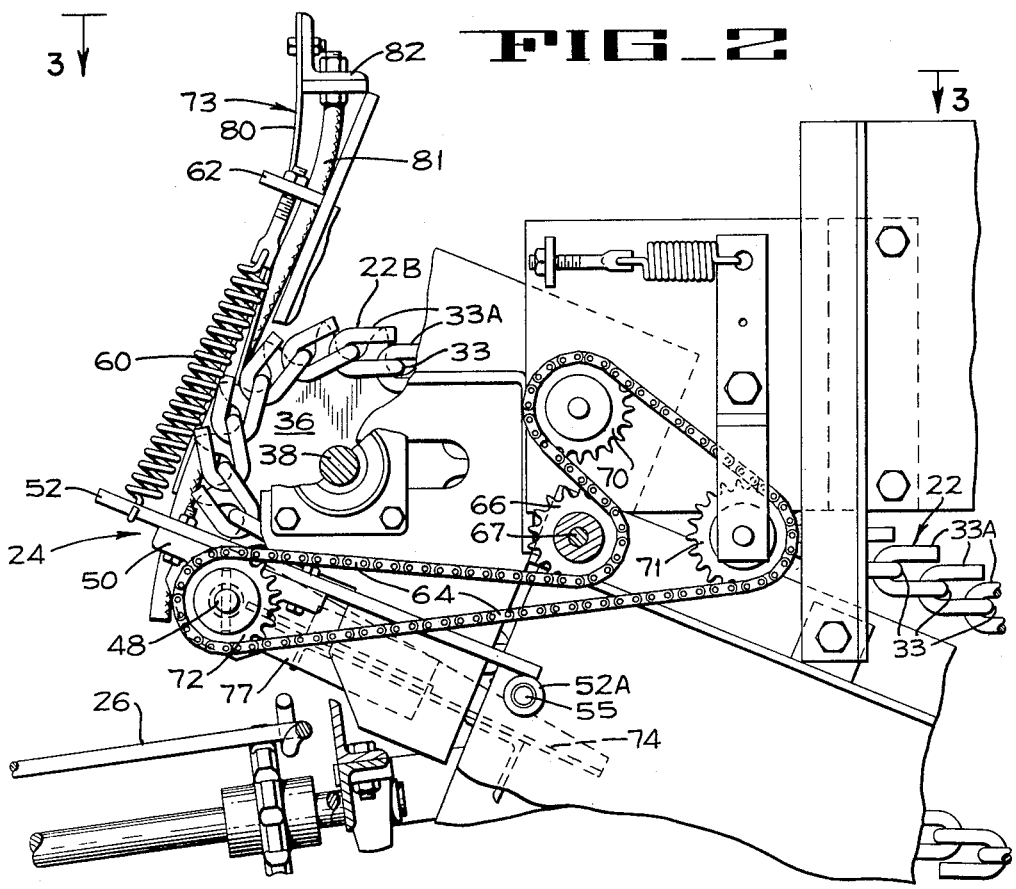
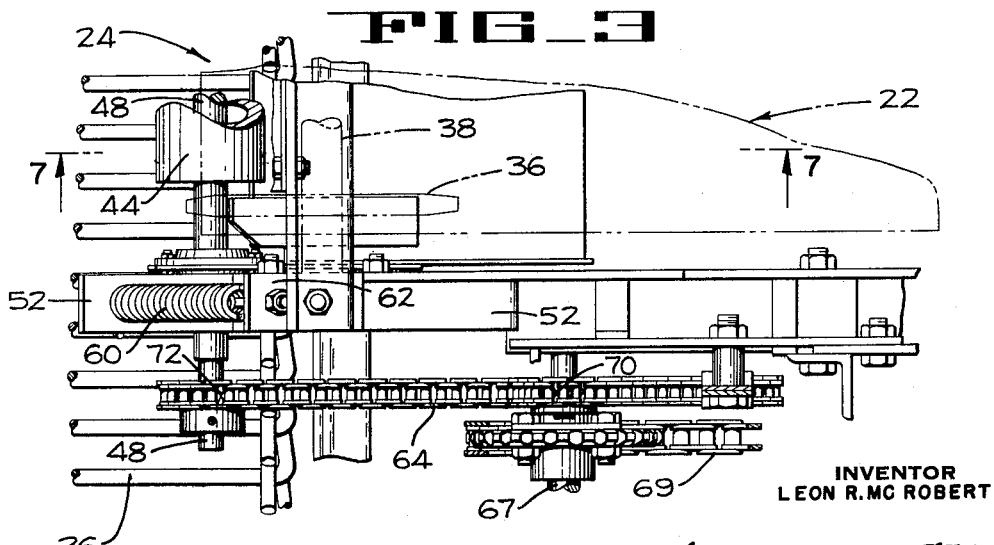
INVENTOR
LEON R. MC ROBERT
BY Hans G. Hoffmeister
ATTORNEY Dec. 28, 1965  L. R. McROBERT  3,225,771
ROLLER-TYPE SEPARATING MEANS FOR A POTATO HARVESTER
Original Filed June 26, 1961  3 Sheets-Sheet 3
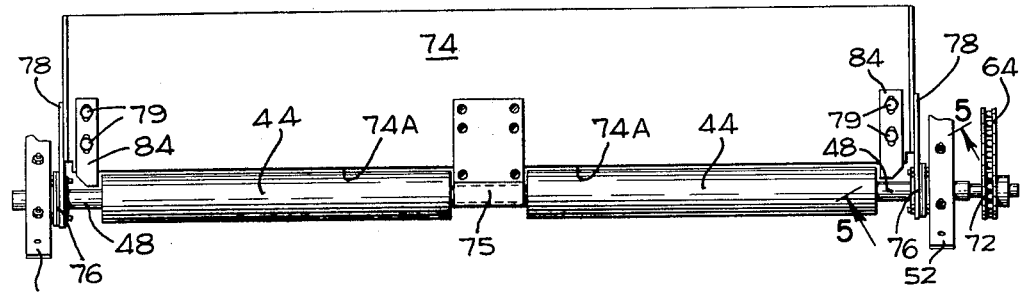
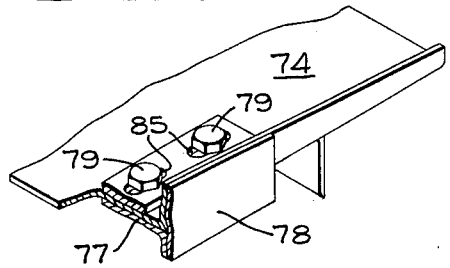
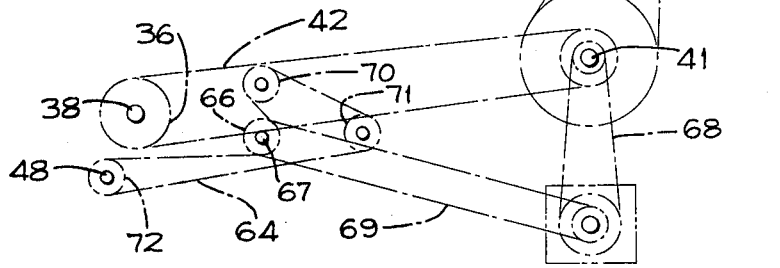
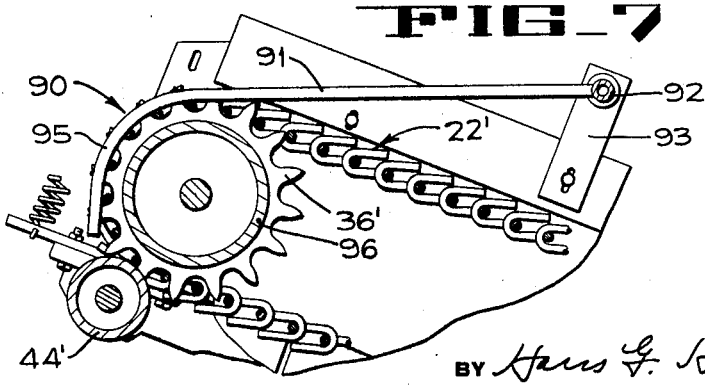
INVENTOR
LEON R. MC ROBERT
BY *Hans G. Hoffmeister*
ATTORNEY

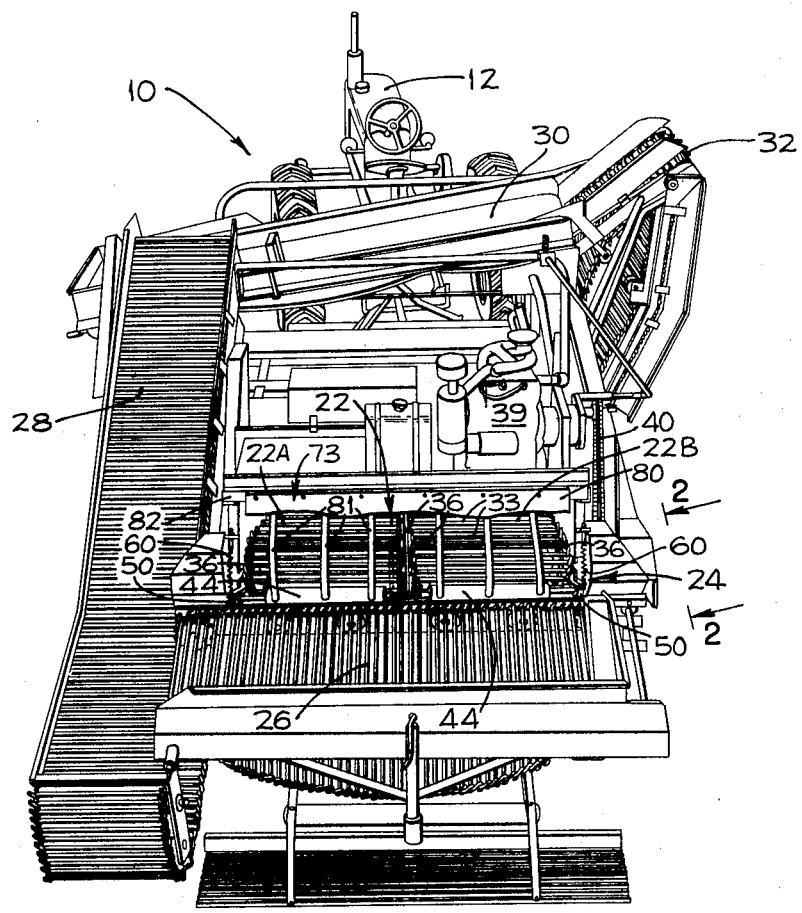

United States Patent Office 3,225,771
Patented Dec. 28, 1965

3,225,771
ROLLER-TYPE SEPARATING MEANS FOR
A POTATO HARVESTER
Leon R. McRobert, Williamston, Mich., assignor to FMC Corporation, San Jose, Calif., a corporation of Delaware
Continuation of application Ser. No. 119,697, June 26, 1961. This application Aug. 26, 1963, Ser. No. 305,027
5 Claims. (Cl. 130—30)

This application is a continuation of my prior copending application, filed June 26, 1961, and bearing Serial No. 119,697, now abandoned.

This invention relates to a potato harvester and more particularly to apparatus for removing potato vines from the conveyor of a potato harvester.

Potato harvesters have been developed which will dig, clean, sort, and bulk-load potatoes in one continuous operation as the harvester passes over a field. In such machines, after the potatoes have been dug from the ground, they are separated from the soil by agitation imparted by an elevator chain on which they are conveyed. Dirt and small rocks fall to the ground through openings in the elevator chain, while roots and vines remain on the chain with the potatoes. Since the vines and roots are bulky, it is desirable that they be removed from the machine as soon as possible. It is therefore an object of the present invention to provide a simple, efficient device for separating potatoes from vines, and removing the vines from the elevating conveyor of a potato harvester.

Another object of the invention is to provide means for preventing potato vines from becoming entangled with the operating machinery of the potato harvester.

Another object of the invention is to provide an improved mounting for a de-vining roller of a potato harvesting machine.

Other objects and advantages of the invention will be apparent from the following detailed description, reference being made to the annexed drawing, in which:

FIG. 1 is a perspective of a potato harvester in which the vine separating mechanism of the present invention is installed.

FIG. 2 is an enlarged fragmentary side elevation, with parts broken away, of a portion of the harvester, the view being taken looking in the direction of arrows 2—2 of FIG. 1.

FIG. 3 is a fragmentary plan, looking in the direction of arrows 3—3 of FIG. 2.

FIG. 4 is a fragmentary plan of the de-vining roller assembly used in the harvester of FIG. 1 but shown disconnected from the harvester.

FIG. 5 is an enlarged perspective, with parts shown in section, looking in the direction of arrows 5—5 of FIG. 4.

FIG. 6 is a schematic showing of a portion of the drive mechanism of the harvester.

FIG. 7 is a fragmentary section taken along lines 7—7 of FIG. 3 but showing a modified vine hold-down mechanism not shown in FIG. 3.

Referring to FIG. 1, a potato harvester 10, on which the vine separating mechanism of the present invention is mounted, is shown connected to the rear end of a towing tractor 12. The potato harvester 10 is supported on a suitable frame which is mounted on four wheels (not shown).

As the harvester is towed along a field, potatoes are dug up from the ground and directed onto an upwardly slanted endless conveyor 22 which conveys them upwardly and rearwardly of the harvester to a de-vining or vine removal section 24. From the de-vining section, the potatoes fall onto a cross conveyor 26 and are transferred laterally to a side elevator 28 (FIG. 1), which lifts the potatoes upwardly and forwardly of the harvester to a sorting table 30. Potatoes are directed along the sorting table 30 to a loading mechanism 32 by which they are discharged from the harvester 10.

The de-vining section 24 is located at the discharge end of the initial elevator 22 which is a bar-type conveyor having two side-by-side sections 22A and 22B. Each section is made up of a plurality of horizontal bars 33 that have transverse hook-shaped ends 33A (FIG. 2) by which the bars are linked together. As seen in FIG. 1, the upper end of the elevator conveyor travels around four driving sprockets 36 that are keyed to a drive shaft 38 (FIG. 2) which is driven from a motor 39 (FIG. 1) by a sprocket and chain drive 40 (FIG. 6), a shaft 41 that is journalled in the frame, and a sprocket and chain drive 42. The rotation of the four drive sprockets 36 causes movement of the conveying surface of the endless bar conveyor due to the fact that each bar 33 of the conveyor is engaged at each end by the teeth of one of these sprockets, as seen in FIG. 2.

Positioned below the upper end of each conveyor section is a de-vining roller 44, both rollers 44 being keyed to a shaft 48 which is supported for free rotation at spaced points along its length in two bearings 50 (FIG. 1). Each bearing 50 is bolted to the forward portion of a rocker bar 52 (FIG. 3) which has a hub portion 52A rotatably supported on a stub shaft 55 fixed to and projecting outwardly from the frame of the machine. A spring 60, which interconnects the forward end of each rocker bar 52 and a frame member 62, urges the rocker arm upwardly so that the two de-vining rollers 44 are held in contact with the undersurface of the portion of elevator conveyor 22 that is moving around the drive sprockets 36.

The de-vining rollers 44 are driven by a drive chain 64 (FIG. 2) that is trained around a drive sprocket 66 which is keyed to a shaft 67, and this shaft 67 is driven by shaft 41 (FIG. 6) through chain and sprocket drives 68 and 69 driven by motor 39. The drive chain 64 is also trained around idler sprockets 70 and 71 (FIG. 2) and around a sprocket 72 keyed to the de-vining roller shaft 48.

As seen in FIG. 2, vines are carried upwardly by conveyor 22 and engage a vine hold-down mechanism 73 that causes the vines to travel around the upper end of the elevator conveyor 22 and then downwardly and forwardly of the machine through the nip between the conveyor chain and the de-vining rollers 44. A stripper plate 74 (FIGS. 2 and 4) is adjustably positioned at the upper rear portion of the de-vining rollers 44 in closely spaced relationship to the rollers to prevent vines from winding about the rollers, and to serve as a guide chute from which the vines drop to the ground. The plate 74 (FIG. 4) is rotatably supported on the de-vining roller shaft 48 by a central bearing unit 75 and by two end bearings 76. Each bearing 76 includes an elongated upright plate 78 (FIGS. 4 and 5) that extends alongside the side edge of the stripper plate 74 and has an angle bracket 77 secured thereto, as by welding. One leg of the bracket 77 underlies the plate 74 and is secured thereto by bolts 79. The holes (not shown) in the bracket 77, which receive bolts 79, may be elongated in a direction parallel to the side edges of the plate 74 so that the plate can be adjusted relative to the rollers 44. Thus, the stripper plate 74 is pivotally supported on the shaft 48, and the inclined position, shown in FIG. 2, that it assumes is determined by the engagement of the plate with fixed or adjustable members (not shown) mounted on the frame of the machine.

Positioned above the upper end of the elevator conveyor 22 is the vine hold-down assembly 73 (FIG. 2) which includes a flexible apron 80, made of heavy canvas or the like (FIG. 1), and a plurality of tubes 81 which are mounted on a transverse frame member 82 (FIG. 2) and extend downwardly along the upper end of the conveyor to hold the vines against the rods of the conveyor and guide the vines downwardly into contact with the de-vining rollers, while permitting the potatoes to fall onto the cross conveyor 26. As mentioned above, as the vines are moved downwardly and forwardly between the rollers 44 and the undersurface of the conveyor 22, the stripper plate 74 strips the vines from the rollers. Accordingly, as seen in FIG. 4, the edge 74A of the plate 74 is positioned close to the de-vining rollers with a minimum running clearance between the plate and the rollers. The central bearing unit 75 spans the opening between the side edges of the rollers, and two short plates 84, which are adjustably secured to the plate 74 by the above mentioned bolts 79 extending through slots 85 in the plates 84, substantially close the openings between the other ends of the rollers 44 and the end bearing 76.

In operation, the periphery of the de-vining rollers 44 and the lower run of elevator conveyor 22 travel in the same direction and at substantially the same speed at the points at which they are in engagement. Accordingly, the vines are positively pulled downwardly and forwardly through the nip between the rollers 44 and the conveyor toward the chute provided by the stripper plate. The resilient pivotal mounting of the de-vining rollers permits a mass of vines or a hard object to pass between the rollers and the conveyor without damage to the mechanism.

When a mixture of potatoes, rocks and vines moves upward on the elevator conveyor 22 toward the discharge point, the mixture spills over the end of the elevator, and the potatoes and rocks fall to the cross conveyor 26 below, while vines are retained by the hold-down assembly 73 and drawn between the de-vining rollers and the lower run of the conveyor 22. Should any potatoes remain attached to the vines, they will be broken off the vines and will fall to the cross conveyor as the vines are drawn between the de-vining rollers and the bars of the conveyor.

It can be seen that the de-vining rollers 44 are positioned with respect to the conveyor 22 so that the potatoes discharged through the plurality of tubes 81 will gravitate away from the rollers and will not fall into the nip. A line drawn tangentially to the end of the conveyor 22 adjacent the tubes 81 which is also perpendicular to the projection of the upper flight of the conveyor 22 will pass outside of the surface of the de-vining rollers, or to the left of the rollers, as viewed in FIGURE 2.

While the de-vining rollers are shown and described as positioned at the discharge end of the initial elevator, it will be understood that a similar roller could also be placed at the discharge end of the cross conveyor 26.

In FIG. 7, a modified vine hold-down mechanism 90 is illustrated mounted on the upper end of an elevator conveyor 22'. The elevator conveyor 22' is substantially identical to the previously described conveyor 22 with the exception that a cylindrical roller 96 is disposed between the drive sprockets 36'. Similarly, a de-vining roller 44' which is identical in construction and operation with the rollers 44, coact with the conveyor 22' to move the vines out of the machine. The hold-down mechanism 90 includes a plurality of metal rods 91 (one only being shown) welded to a shaft 92 that is pivotally mounted in a pair of upstanding support posts 93, one post being disposed on each side of the elevator conveyor 22'. Each bar has a curved outer end 95 that extends around the cylindrical guide roller 96 that is disposed between the drive sprockets 36' of the elevator conveyor 22'. The number of bars and the length of roller 96 will depend upon the width of the conveyor. It has been found that one bar per foot of width will operate satisfactorily. It will be evident that the bars 91 bear down on the vines due to their weight and hold the vines on the conveyor as they are directed to the nip between the conveyor and the de-vining roller. The cylindrical guide roller 96 prevents vines from falling downwardly and becoming entangled in the lower run of the conveyor at this critical area.

It will be understood that modifications and variations of the embodiment of the invention disclosed herein may be resorted to without departing from the scope of the concepts of the present invention. Therefore, the present invention is limited only by the scope and proper interpretation of the claims appended hereto.

What I claim as new and desire to protect by Letters Patent is:

1. In a potato harvester, means for separating vines from potatoes comprising an endless conveyor for conveying potatoes and vines to a potato discharge station, a de-vining roller mounted at said discharge station with its roller surface being substantially parallel to and adjacent to the conveyor surface on the underside of said endless conveyor to define a nip therebetween for separating said vines and potatoes, the de-vining roller being positioned with respect to the conveyor so that the tangential projection from said conveyor at said discharge station which is perpendicularly located with respect to the projection of the upper flight of the conveyor passes outside of said roller surface whereby potatoes discharged at said discharge station will gravitate away from said roller and said nip, a plurality of transversely spaced members positioned adjacent the conveyor at the discharge end thereof to retain said vines on the conveyor and direct them to said nip, the spacing between said members being such that said potatoes will pass therethrough, means mounting said roller for movement toward and away from said conveyor, means for directing vines to said nip between said roller and said conveying surface, and drive means for rotating said roller in a direction to move the periphery of said roller at said nip in substantially the same direction as said conveying surface at the nip whereby said driven roller and said conveyor draw vines through said nip causing any remaining potatoes to be separated from the vines, said drive means being operatively connected with said roller to supply positive driving power in all positions of the roller as it is moved away from or toward said conveyor.

2. In a potato harvester, means for separating vines from potatoes comprising an endless conveyor having an upper reach for conveying potatoes and vines to a potato discharge station and a lower reach movable away from said station, a shaft rotatably journalled adjacent the undersurface of said lower reach, said shaft being mounted for movement toward and away from said lower reach, a de-vining roller keyed to said shaft and disposed closely adjacent the undersurface of said lower reach at said discharge station, means for directing vines into the nip between said roller and said undersurface while permitting said potatoes to be discharged therethrough, a stripper plate freely pivoted on said shaft and having an edge portion disposed closely adjacent said roller on the downstream side of said nip to strip vines from said roller, and means for rotating said shaft whereby vines directed into said nip will be conveyed through said nip by said roller and said lower reach.

3. In a potato harvesting device, means for separating potatoes from vines comprising a support structure, a plurality of sprockets rotatably about a fixed axis on said structure, an endless conveyor trained around said sprockets and having a lower reach movable at a predetermined speed in a fixed direction, a de-vining roller disposed closely adjacent and transversely of said lower reach, a plurality of spaced rubber rods mounted on said support structure and projecting downwardly alongside the portion of the conveyor that is disposed around said sprockets, said spaced rods being effective to allow loose potatoes to pass between the rods but to engage vines carried on said conveyor portion and direct them to the nip between said roller and said lower reach, and means for driving said roller in such a direction and at such a speed that the periphery of said roller at said nip moves in substantially the same direction and at substantially the same speed as said conveying surface, whereby vines directed to said nip by said rubber rods are conveyed through the nip by said conveyor and said roller.

4. In a potato harvester, means for separating vines from potatoes comprising a support structure, a plurality of sprockets mounted for rotation on a fixed axis, an endless conveyor trained around said sprockets and having an upper reach for conveying potatoes and vines to a potato discharge station and a lower reach movable away from said station, a de-vining roller disposed closely adjacent the undersurface of said lower reach at said discharge station, a plurality of spaced rigid rods pivotally mounted on said structure and having curved ends overlying the portion of said conveyor at said discharge station disposed around said sprockets, said rods being arranged to permit loose potatoes to pass between the rods and to press down on the vines on said conveyor portion and direct them downwardly toward the nip between said roller and the undersurface of said conveyor lower reach, and a stripper plate disposed closely adjacent said roller on the downstream side of said nip to strip vines from said roller.

5. In a potato harvesting device, means for separating vines from potatoes comprising a conveyor having a conveying surface movable at a predetermined speed in a fixed direction, a shaft rotatably mounted adjacent said conveying surface, a pair of de-vining rollers secured to said shaft and having end portions in spaced relation on said shaft, means for directing vines to the nip between said rollers and said conveying surface, a pair of mounting arms pivotally mounted on said shaft, each arm being disposed adjacent to but spaced from an end of one of said rollers, a stripper plate secured to said mounting arms and having an edge close to said roller on the downstream side of said nip, a pair of closure plates adjustably secured to said stripper plate, each closure plate having an end portion projecting into the space between one of said mounting arms and the adjacent end of the adjacent roller, and a bearing mounted on said stripper plate and having a journal portion disposed around said shaft between the adjacent ends of said rollers.

References Cited by the Examiner
UNITED STATES PATENTS

| 2,365,077 | 12/1944 | Hertzler et al. | 130—30 |
| 2,711,742 | 6/1955 | Lavers | 130—30 |
| 2,901,048 | 8/1959 | Krukowski | 130—30 |

ABRAHAM G. STONE, *Primary Examiner.*

ANTONIO F. GUIDA, T. GRAHAM CRAVER,
*Examiners.*